United States Patent [19]

Godwin

[11] 4,409,507

[45] Oct. 11, 1983

[54] DYNAMOELECTRIC MACHINES FOR MULTIPLES OF THREE PHASES WITH UNBALANCED FRACTIONAL-SLOT WINDINGS

[75] Inventor: Gurney L. Godwin, Georgetown, Tex.

[73] Assignee: Westinghouse Electric Corp., Pittsburgh, Pa.

[21] Appl. No.: 392,427

[22] Filed: Jun. 28, 1982

[51] Int. Cl.³ .......................................... H02K 23/34
[52] U.S. Cl. ................................... 310/205; 310/184
[58] Field of Search ............... 310/180, 179, 184, 162, 310/198, 200, 201, 202, 203, 204, 205, 206, 207, 208, 166

[56] References Cited

U.S. PATENT DOCUMENTS

| | | | |
|---|---|---|---|
| 2,414,571 | 1/1947 | Veinott | 310/198 |
| 2,790,099 | 4/1957 | Nyyssonen | 310/202 |
| 3,470,409 | 9/1969 | Scheda | 310/180 |
| 4,132,914 | 1/1979 | Khutoretsky et al. | 310/184 |
| 4,220,881 | 9/1980 | Hamilton et al. | 310/184 |

*Primary Examiner*—R. Skudy
*Attorney, Agent, or Firm*—G. H. Telfer

[57] ABSTRACT

A winding technique for multiphase machines is presented that utilizes a core of Q slots and P poles for M phases where Q/M is an integer but the number of slots per phase per pole Q/M/P is a non-integer expressible as a fraction N/D reduced of common factors and M and D have a common factor of at least two. Fractional-slot, nearly but not quite balanced, windings are provided by providing a distant coil grouping for D poles in which the number of coils in the coil groups for the D poles equals N for an individual phase and the pattern is repeated for the additional poles to provide the total of P pole windings. The near balancing of the windings succeeds in achieving sufficient voltage balancing and low torque harmonics for successful operation and is advantageous for avoiding a need to provide additional core designs.

6 Claims, 10 Drawing Figures

DYNAMOELECTRIC MACHINES FOR MULTIPLES OF THREE PHASES WITH UNBALANCED FRACTIONAL-SLOT WINDINGS

BACKGROUND AND SUMMARY OF THE INVENTION

This invention relates to dynamoelectric machines such as synchronous motors for operation from an AC power supply of six or more phases with fractional-slot windings that are slightly unbalanced but still achieve low torque harmonics.

Static power conversion equipment is used to convert three phase power from a power line to a higher number of phases for driving motors. For example, adjustable frequency synchronous motors are being designed for six, twelve and twenty-four pulse inverter systems for three, six and 12 phase operation, respectively. Even higher pulse numbers may be used in the future. The use of pulse numbers of multiples of six is desirable to reduce harmonic torque levels and damper losses. The design of such motors is complicated by the fact that a motor manufacturer has available certain existing stator punchings which fix the number of available slots. The available punchings and coil designs are primarily designed for six pulse (three phase) operation and often are not readily adaptable to six or 12 phase machines. A general purpose of this invention is to provide machines with windings for multiples of three phases in cores having slot designs for three phases and to do so without adversely affecting machine performance to any significant degree.

It is straightforward to take an existing machine design for three phase operation and to simply regroup the windings to provide six phase operation if the slot numbers happen to be correct for the higher number of phases. For example, a six pole, 72 slot machine offers a variety of possibilities. It can be connected without problems for six pulse, 12 pulse, or 24 pulse operation, that is either three, six or 12 phases, because the number of coil slots per phase per pole is in each instant an integer. This is another way of saying that the winding for the number of slots used for three phases can be regrouped into two or four separate windings for six or 12 phases. This permits both six phase and 12 phase balanced windings, with uniform spacing, easily.

Uniform spacing is desirable so that adjacent voltage peaks produced by uniform converter pulse spacing are separated by 360° divided by the pulse number. Therefore, the ideal angle for six phase (12 pulse) operation is 30° and for 12 phase (24 pulse) operation it is 15°. Unless the spacing conditions are satisfactory, a principal reason for going to pulse numbers higher than six, namely to achieve reduced torque harmonics, would be defeated.

The problem is that sometimes the number of slots per phase per pole of the desired machine is not an integer. For example, a three phase, six pole machine with 90 slots has five slots per phase per pole but if it is desired to use that same slot number for a six phase, six pole machine the number of slots per phase per pole is 2½ and for a twelve phase machine the number of slots per phase per pole is 1¼. This means a normal winding is not attainable for a six or 12 phase machine of six poles and 90 slots. Some designers might be tempted to circumvent the problem by using balanced windings and uniform spacing but allowing the slot numbers to be unequal. This type of winding is referred to as a balanced, fractional-slot winding. Such a winding for the six phase embodiment would use three slots per phase per pole for a first winding (for phases A, −C and B) and two slots per phase per pole for a second winding (for phases A', −C' and B'). This would result in voltages of 4800 volts and 3200 volts, respectively, in the two windings in a given application instead of the desired voltage of 4000 volts for both windings and would have adverse effects on the equipment driven by the motor.

The art of winding three phase AC machines (for example, see Liwschitz-Garik, *Winding Alternating-Current Machines,* D. Van Nostrand Company, 1950, which is a standard reference) includes both balanced fractional-slot windings and unbalanced fractional-slot windings. What is not believed previously known is a design technique for multiples of three phases with unbalanced fractional-slot windings that achieves objectives of low harmonics and nearly equal voltages.

In accordance with the present invention, unbalanced fractional-slot windings are used for six phases, or other multiples of three phases, with a winding connection arrangement such that substantially equal voltages are provided and torque harmonics are minimized. In general, the winding scheme of this invention applies to machines in which the number of coil slots per phase per pole is a non-integer expressible as a simple fraction N/D where D is two or more and the number of phases is at least six and is an integral multiple of three. The winding comprises a plurality of coils of which selected numbers are connected into coil groups of unequal numbers of coils distributed throughout the machine for a particular phase. The numbers of coils within the coil groups is related to the ratio N/D. The number of successive pole windings whose coil groups for the total number of phases is a distinct repeatable pattern for the total winding is equal to D. The number of individual coils within the coil groups for each individual phase within the D pole windings is N.

Several examples of machine arrangements in accordance with the present invention are given hereinafter and it will be apparent how the technique of the invention may be applied to other specific embodiments. The present invention provides a degree of design flexibility not previously available because now a winding design can be provided that achieves the purposes of accommodating an existing core pattern that has been primarily designed for use for three phase windings but is now extended to applications of multiples of three phase windings with the achievement of relatively balanced voltages and reduced harmonics by the selective application of unbalanced windings.

BRIEF DESCRIPTION OF THE DRAWINGS

FIGS. 5A and 5B are shown for understanding and contrast to the winding of FIG. 5C.

DESCRIPTION OF EMBODIMENTS

Initially some terminology will be explained so the subsequent discussion can proceed more readily. This terminology is consistent with prior AC machine practice.

The discussion applies to AC machines that have a core of a given number of coil slots Q and a given number of poles P. The core may be a stator core of a synchronous machine or an induction machine or it could be a rotor core of a wound-rotor induction machine. We are primarily interested here in synchronous motors. It will be apparent the machines could also be operated as generators.

The number of phases of a given machine winding is referred to as M. The number of coil slots per phase per pole will be referred to as Q/M/P.

Q/M/P is in all instances expressible as a fraction N/D which is the numerical value of Q/M/P reduced by all common factors between the numerator N and the denominator D.

A single coil may be of any number of conductive turns. Each coil has a first side in a first slot and a second side in a second slot. In the present discussion, the windings discussed may be full-pitch windings, meaning the slots accommodating two sides of a given coil are spaced by one pole pitch where the pole pitch is Q/P slots.

A coil group is a number of coils that are connected, normally in series, for an individual phase winding of one pole. As used herein a "coil group" includes zero or more numbers of coils in order to make clear a zero coil group is usable where the total number of coil groups (including those of zero coils) is the number of poles times the number of phases (P×M).

Preparatory to a presentation of specific embodiments of the present invention there will be discussed by way of background illustration some examples of the use of balanced windings so it may be better understood under what circumstances the use of unbalanced fractional-slot windings in accordance with the present invention becomes advantageous.

Figure 1A:
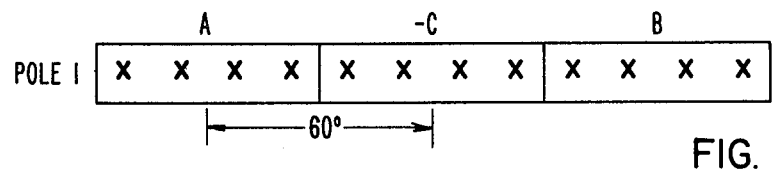
FIGS. 1A, 1B, and 1C are respectively connection diagrams for three phase, six phase, and 12 phase windings of a six pole, 72 slot configuration which illustrates for purposes of background understanding an instance in which balanced windings are achieved and the concepts of this invention are unnecessary.
Figure 1B:
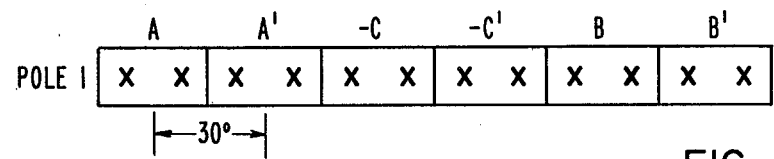
Figure 1C:
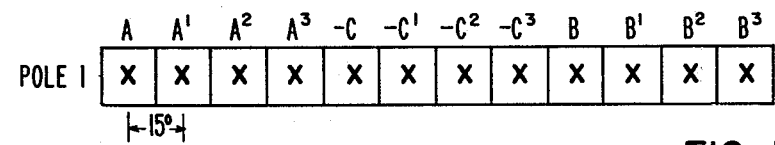

FIGS. 1A, 1B, and 1C show coil groups for a six pole (P=6), 72 slot (Q=72) machine wound for, respectively, three, six and 12 phases in which each winding is a balanced, integral slot winding in accordance with prior practice.

Referring to FIG. 1A, a three phase winding is shown. In this instance the number of slots per phase per pole (Q/M/P) is four and it is hence straightforward to lay out a winding configuration of which pole 1 is illustrated including four coils in each coil group for each pole phase winding A, −C, and B with repetition of this pole grouping connection to complete the six poles so that there are a total of eighteen (three phases × six poles) of the pole phase windings each of which includes four coils with uniform electrical spacing of 60°.

Consider now the same machine design wound for six phase operation, shown in FIG. 1B. This is equally a simple arrangement because the number of slots per phase per pole (Q/M/P) equals the whole number 2. Hence for a single pole as shown each of the coil groups for each pole phase winding contains two coils and there is a uniform spacing of 30° between groups.

Similarly, as shown in FIG. 1C, this particular machine may be provided with a 12 phase winding. The number of slots per phase per pole (Q/M/P) is conveniently one and each of the coil groups of one coil each is electrically spaced from those adjacent to it by 15°, the slot spacing angle.

In each of the preceding drawings the connection diagram is shown for a single pole of 12 slots and would be repeated in order to provide the complete six pole arrangement utilizing all 72 slots.

Figure 2A:
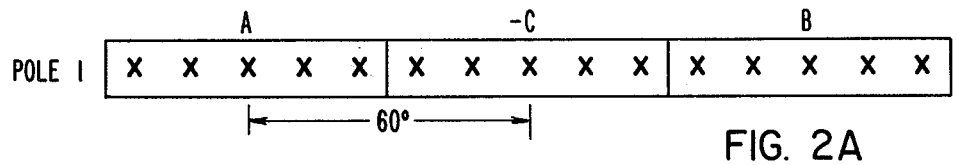
FIGS. 2A and 2B illustrate connection diagrams for a six pole, 90 slot machine of respectively three and six phases with FIG. 2B illustrating a balanced fractional-slot winding connection resulting in unfavorable voltage distribution.

Referring to FIG. 2A, there is shown a configuration for a six pole, 90 slot machine of three phases. As in the previous example the coil grouping is straightforward as the number of slots per phase per pole (Q/M/P) is the integer 5 and there can be provided five coils per phase per pole with uniform electrical spacing. The arrangement shown is for a single pole and would be repeated around the machine to provide six poles.

Figure 2B:
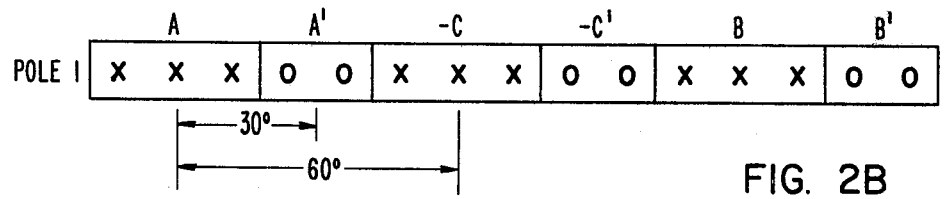

Referring to FIG. 2B, here is a case in which we can see a difficulty one arrives at in adapting certain core punchings designed for three phase machines for six or more phases. In this instance, we are taking the same core for six poles and 90 slots that was used in the example of FIG. 2A but now we are providing it with a six phase winding. The number of slots per phase per pole (Q/M/P) now becomes 2½ and N/D=5/2. Balanced integral slot windings can be achieved in the configuration as shown for a single pole where each adjacent phase winding in the pole is uniformly spaced by 30°, although the slot spacing is 12°, and there are three coil groups and then two coil groups in each successive pair of adjacent phase windings. The connection grouping is therefore 3, 2 repeated to provide a total of 36 coil groups for the machine. The difficulty is that despite achieving balanced windings with uniform spacing, the unequal numbers of coil groups in the pole phase windings produce unequal voltages. Those which have a Q/M/P of three would produce line voltages of for example 4800 volts and those with a Q/M/P of two 3200 volts in a given application instead of the desired voltage of 4000 volts for both windings. That is, the winding as presented would inherently produce voltages that are the desired voltage plus or minus 20%. Therefore such an arrangement would normally not be considered usable.

Figure 3:
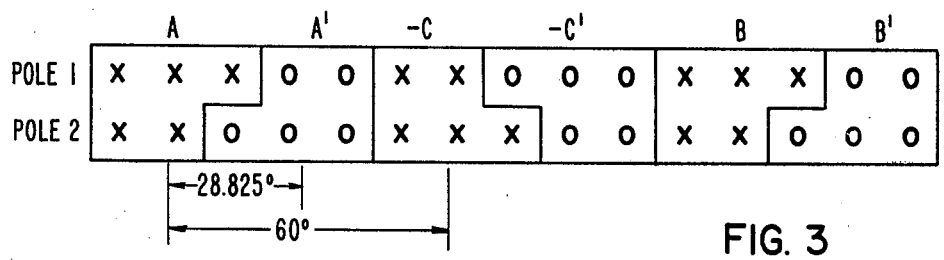
FIG. 3 illustrates a connection diagram for an embodiment of the present invention in a six pole, 90 slot stator of a motor for six phase operation employing unbalanced fractional-slot windings arranged and interconnected in accordance with an embodiment of the present invention.

In FIG. 3 an embodiment of the present invention is presented which solves the problem encountered with the arrangement of FIG. 2B. Here the same six pole, 90 slot machine is used for a six phase winding. However unbalanced fractional slot windings are intentionally used to achieve a substantial balancing of voltages and a reduction of torque harmonics. A general condition indicating the usefulness of this approach is that the number of slots per phase per pole is 5/2 and the denominator, D=2, is evenly divisible into the number of phases 6. What we have here is a connection grouping for two (equal to D) poles which is a distinct repeatable pattern that can be repeated for the additional four poles. As shown, what is done is to provide three coils in the coil group for phase A in pole 1 and two coils in the coil group phase A for pole 2. The opposite number of coils are grouped in the coil groups of phase A1 where there are two coils in the coil group for pole 1 and three in the coil group for pole 2. The connection grouping within a given pole and continuing to subsequent poles is a grouping of coils within coil groups where the coils number 3, 2, 2, 3 and this connection grouping is repeated throughout the machine for each of the required 36 pole phase windings. The same can be seen to result if the connection grouping is 2, 3, 3, 2.

It can be established that the effective spacing of adjacent phases A and A1, the angle between phase voltage tensors VA and VA1, theta, is 28.825° rather than the ideal of 30°. However, this error of 1.175° is found to be quite tolerable and preferable in terms of overall performance as compared to the winding connection of FIG. 2B which has uniform or ideal spacing. The reduction factor for the sixth harmonic torque pulsation is given by the formula sine 3 $(\theta - 30°)$ and equals 0.0615 in this instance. While the reduction factor in actual performance that is needed is not a precise number, it has been found through experience that good usable reduction factors can be obtained by this technique in employing standard punchings.

It is also the case that the spacing between each alternate set of phase windings, such as A and $-C$, is uniformly 60° in the embodiment of FIG. 3.

For the same machine of six poles and 90 slots, the provision of a 12 phase winding in accordance with the techniques of this invention is not appropriate because the number of coils for a phase cannot be divided into four equal groups which would be necessary. That is, $Q/M/P = N/D$ where D must be a number such that $Q/D$ is an integer for the technique of this invention to apply.

Figure 4:
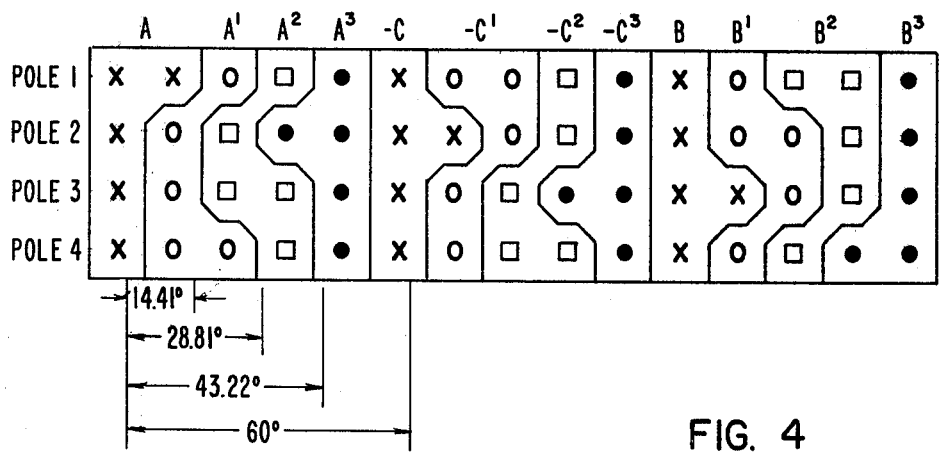
FIG. 4 illustrates winding connection diagrams for additional embodiments of the present invention.

For further description of this technique, reference is made to FIG. 4 in which a machine is provided of 12 poles and 180 slots. Such a machine can be designed for 12 phase operation in accordance with the present invention. The number of slots per phase per pole $(Q/M/P)$ is 5/4 and 4 is evenly divisible into 180 while it is not into 90. Since the denominator 4 and the number of phases 12 have a common factor, 2, a perfect 12 phase balanced winding is not possible. Applying the technique of the invention results in the connection diagram as shown in which for the first through the fourth poles a distinct pattern of coil groupings is 2, 1, 1, 1, 1, 2, 1, 1, 1, 1, 2, 1, 1, 1, 1, 2 repeated two more times for the total winding which consists of 144 coil groups.

The arrangement as shown in FIG. 4 results in a spacing of 14.41° between immediate adjacent phases A and A1, 28.81° between A and A2, 43.22° between A and A3 and 60° between A and $-C$. Again the obtained angles are sufficiently close to result in low torque harmonics.

Reference is made to FIGS. 5A, 5B and 5C. This is for a 14 pole machine with 60 slots and in the respective views M=3, 6 and 12 giving a number of slots per phase per pole of N/D=10/7, 5/7 and 5/14. These examples show that even starting with a balanced fractional slot winding for 3 phases the disclosed technique can work. That is, even for the three phase case the number of slots per phase per pole is 10/7. When the basic three phase winding is balanced, the six and 12 phase windings will be balanced unless M and D have a common factor. When M and D have a common factor the windings can be held nearly equal in magnitude and angle. The six phase case, FIG. 5B, is no problem since M and D have no common factor but the M=12 case is one in which the coil grouping must be adjusted so that all groups for a given phase have the same number of coils and nearly the ideal spacing although unbalanced to some extent.

In FIG. 5C, the connection for the 12 phase case is laid out. Q/M/P equals 60/12/14. Further the winding comprises 60 coils connected into 168 coil groups of 1 and zero coils per coil group where the 14 poles have a total of 5 coils for an individual phase N/D=5/14 so D=14 and the pattern shown is for the complete 14 poles rather than being repeated as in the prior examples of FIGS. 3 and 4. The number of coils for each phase in the 14 poles is N=5. Some pole windings for a given phase therefore have zero coils and the connection grouping as shown is 1, 0, 1, 0, 0, 1, 0, 0, 1, 0, 0, 1, 0, 0, 1, 0, 0, 1, 0, 1, 0, 0, 1, 0, 0, 1, 0, 0, repeated to complete the 168 coil groups for all poles.

The resulting angles between phases A and A1 can be shown to be 14.40°, 30° between A and A2, 44.40° between A and A2, and 60° between A and A3.

From the examples of FIGS. 3, 4 and 5C, general characteristics of the applicability of the invention can be seen. One starts with a core punching that gives a balanced 3 phase winding. If the 3 phase winding can be regrouped by simple division to provide higher multiples of phases such as 6 or 12, the winding can be provided without the use of the invention. But if that is not the case and Q/M is an integer, then an approximately balanced winding for the desired number of phases can be obtained in accordance with the invention. Such a machine is preferable in terms of cost and performance rather than having to provide redesigned core punchings or using a balanced winding of unequal coil groups such as in FIG. 2B.

The invention permits the winding connection to be determined in an orderly fashion. One determines if Q/M is an integer and if Q/M/P is a non-integer. If so, the simplified fraction N/D is taken to find the number of poles D through which the number of coils in the coil groups for each phase shall be N and lays out a pattern of closely numbered but unequal coil groups (n and n+1, e.g. 3 and 2, 2 and 1, and 1 and 0) differing by no more than one.

Referring back to FIG. 3, the coil grouping is one in which n=3 and n−1=2. While the specific pattern shown has a repeated grouping of 3, 2, 2, 3 coils that is not the only connection pattern available. For example, in pole 1, phase $-C$ could have 3 coils and phase $-C1$ could have 2 while in pole 2 the numbers of coils for phases $-C$ and $-C1$ are 2 and 3, respectively.

Thus, the pattern as given which is essentially:

|        | A | A' | −C | −C' | B | B' |
|--------|---|----|----|-----|---|----|
| pole 1 | 3 | 2  | 2  | 3   | 3 | 2  |
| pole 2 | 2 | 3  | 3  | 2   | 2 | 3  | could be replaced by:

|        | A | A' | −C | −C' | B | B' |
|--------|---|----|----|-----|---|----|
| pole 1 | 3 | 2  | 3  | 2   | 3 | 2  |
| pole 2 | 2 | 3  | 2  | 3   | 2 | 3  |

The FIG. 4 embodiment may be similarly varied. As shown the pattern is:

|      | A | A1 | A2 | A3 | −C | −C1 | −C2 | −C3 | B | B1 | B2 | B3 |
|------|---|----|----|----|----|-----|-----|-----|---|----|----|----|
| pole | 2 | 1  | 1  | 1  | 1  | 2   | 1   | 1   | 1 | 1  | 2  | 1  |

|   | A | A1 | A2 | A3 | −C | −C1 | −C2 | −C3 | B | B1 | B2 | B3 |
|---|---|----|----|----|----|----|----|----|---|----|----|----|
| pole 1 | 1 | 1 | 1 | 2 | 2 | 1 | 1 | 1 | 1 | 2 | 1 | 1 |
| pole 2 | 1 | 1 | 2 | 1 | 1 | 1 | 1 | 2 | 2 | 1 | 1 | 1 |
| pole 3 | 1 | 2 | 1 | 1 | 1 | 1 | 2 | 1 | 1 | 1 | 1 | 2 |

An essentially equivalent pattern would be:

|   | A | A1 | A2 | A3 | −C | −C1 | −C2 | −C3 | B | B1 | B2 | B3 |
|---|---|----|----|----|----|----|----|----|---|----|----|----|
| pole 1 | 2 | 1 | 1 | 1 | 1 | 1 | 1 | 2 | 2 | 1 | 1 | 1 |
| pole 2 | 1 | 2 | 1 | 1 | 1 | 1 | 2 | 1 | 1 | 2 | 1 | 1 |
| pole 3 | 1 | 1 | 2 | 1 | 1 | 2 | 1 | 1 | 1 | 1 | 2 | 1 |
| pole 4 | 1 | 1 | 1 | 2 | 2 | 1 | 1 | 1 | 1 | 1 | 1 | 2 |

The various acceptable patterns all have the characteristic the total of all the A phase coils equals the total of the B and C phase coils. This is why uniform 60° spacing is shown between A and −C and results from the fact of starting with a coil slot number that gives balanced windings for 3 phases.

Therefore, it is seen a specific connection grouping can be chosen among various possible ones while utilizing the N/D ratio to determine the number of poles D that are to have N coils in the coil groups of an individual phase and to repeat that pattern for subsequent poles as required.

What is claimed is:

1. An AC dynamoelectric machine comprising:
an AC winding configured for M phases, where M is an integral multiple of three, disposed in a core having uniformly spaced coil slots numbering Q and a number of electrical poles P where the number of coil slots per phase (Q/M) is an integer, and the number of coil slots per phase per pole (Q/M/P) is a non-integer expressible as a simple fraction having a numerator N and a denominator D, where D is two or more and M and D have a common factor of at least two;
said winding comprising a plurality of coils of one or more turns, each of which has two coil sides respectively disposed in two of said coil slots, and selected numbers of said coils are connected into coil groups of which some are of unequal numbers of coils, where the number of successive poles whose coil groups for the M phases are a distinct repeatable pattern for the total winding is D, and D times X, where X is an integer, equals P, and the number of individual coils within the coil groups for each individual phase within said D pole windings is N.

2. A dynamoelectric machine in accordance with claim 1 wherein:
said coil groups of said winding each consist of a number of individual coils differing from the number of individual coils of each other of said coil groups consist by no more than one.

3. A dynamoelectric machine in accordance with claim 1 wherein:
M equals 6 phases; P equals 6 poles; Q equals 90 slots; Q/M/P equals 2½ slots per phase per pole; N/D equals 5/2; and,
said winding comprises 90 coils connected into 36 coil groups of 3 and 2 coils per coil group where each successive 2 poles have a total of 5 coils for an individual phase.

4. A dynamoelectric machine in accordance with claim 3 wherein:
said coil groups are connected in a sequence of 3, 2, 2 and 3 coils that is repeated to complete said distinct repeatable pattern in the following manner:

| phase | A | A' | −C | −C' | B | B' |
|---|---|---|---|---|---|---|
| pole 1 coils/coil group | 3 | 2 | 2 | 3 | 3 | 2 |
| pole 2 coils/coil group | 2 | 3 | 3 | 2 | 2 | 3 | and said coil connection pattern is repeated twice for poles three through six to complete all 36 coil groups.

5. A dynamoelectric machine in accordance with claim 1 wherein:
M equals 12 phases; P equals 12 poles; Q equals 180 slots; Q/M/P equals 1¼ slots per phase per pole; N/D equals 5/4; and
said winding comprises 180 coils connected into 144 coil groups of 2 and 1 coils per coil group where each successive 4 poles have a total of 5 coils for an individual phase.

6. A dynamoelectric machine in accordance with claim 1 wherein:
M equals 12 phases; P equals 14 poles; Q equals 60 slots; Q/M/P equals N/D equals 5/14; and
said winding comprises 60 coils connected into 168 coil groups of 1 and zero coils per coil group where the 14 poles have a total of 5 coils for an individual phase.

* * * * *